US012803725B2

(12) United States Patent
Tusha et al.

(10) Patent No.: US 12,803,725 B2
(45) Date of Patent: Nov. 17, 2026

(54) FLEXIBLE RESOURCE GRID DESIGN FOR ORTHOGONAL TIME FREQUENCY SPACE (OTFS) WAVEFORM

(71) Applicant: ISTANBUL MEDIPOL UNIVERSITESI, Istanbul (TR)

(72) Inventors: Armed Tusha, Istanbul (TR); Muhammad Sohaib Jamal Solaija, Istanbul (TR); Hüseyin Arslan, Istanbul (TR)

( * ) Notice: Subject to any disclaimer, the term of this patent is extended or adjusted under 35 U.S.C. 154(b) by 243 days.

(21) Appl. No.: 18/719,617

(22) PCT Filed: Dec. 8, 2022

(86) PCT No.: PCT/TR2022/051453
§ 371 (c)(1),
(2) Date: Jun. 13, 2024

(87) PCT Pub. No.: WO2023/113740
PCT Pub. Date: Jun. 22, 2023

(65) Prior Publication Data

US 2025/0047430 A1 Feb. 6, 2025

(30) Foreign Application Priority Data

Dec. 15, 2021 (TR) ............................... 2021/020126

(51) Int. Cl.
*H04L 5/00* (2006.01)
*H04L 27/01* (2006.01)
*H04L 27/26* (2006.01)

(52) U.S. Cl.
CPC .......... *H04L 5/0007* (2013.01); *H04L 5/0016* (2013.01); *H04L 5/0053* (2013.01); *H04L 27/01* (2013.01); *H04L 27/26025* (2021.01); *H04L 27/2607* (2013.01); *H04L 27/2639* (2013.01)

(58) Field of Classification Search
CPC ... H04L 5/0007; H04L 5/0016; H04L 5/0053; H04L 27/01; H04L 27/26025; H04L 27/2607; H04L 27/2639
See application file for complete search history.

(56) References Cited

U.S. PATENT DOCUMENTS

2019/0238189 A1* 8/2019 Delfeld .................... H04J 11/00
2021/0126726 A1* 4/2021 Parkvall ............... H04B 7/0452

FOREIGN PATENT DOCUMENTS

WO 2018031938 A1 2/2018

OTHER PUBLICATIONS

International Search Report for corresponding PCT/TR2022/051453 dated Mar. 7, 2023.
Written Opinion of the International Searching Authority for corresponding PCT/TR2022/051453 dated Mar. 7, 2023.

* cited by examiner

*Primary Examiner* — Angela Widhalm De Rodriguez
(74) *Attorney, Agent, or Firm* — Egbert, McDaniel & Swartz, PLLC

(57) ABSTRACT

Disclosed is a method for resource allocation in the delay-Doppler grid that assigns radio resources to the users in a flexible manner taking into consideration their specific requirements. The method provides a flexible structure for Orthogonal Time Frequency Space (OTFS) waveform in terms of resource allocation/scheduling. This flexibility is imperative for the ever-increasingly diverse user requirements of wireless communication systems in terms of reliability, latency, data rates, mobility, security etc.

4 Claims, 1 Drawing Sheet

FLEXIBLE RESOURCE GRID DESIGN FOR ORTHOGONAL TIME FREQUENCY SPACE (OTFS) WAVEFORM

TECHNICAL FIELD

The aim of this invention is to devise a method for resource allocation in the delay-Doppler grid that assigns radio resources to the users in a flexible manner taking into consideration their specific requirements.

The method of invention provides a flexible structure for Orthogonal Time Frequency Space (OTFS) waveform in terms of resource allocation/scheduling. This flexibility is imperative for the ever-increasingly diverse user requirements of wireless communication systems in terms of reliability, latency, data rates, mobility, security etc.

PRIOR ART

Wireless communication has diverged and evolved continuously, growing from basic voice communication to enhanced broadband, massive connectivity, ultra-reliable and low-latency applications over time. This divergence in applications is expected to continue with the sixth-generation (6G) systems in the form of services such as further-enhanced mobile broadband (FeMBB), ultra-massive machine-type communication (umMTC), extremely reliable and low-latency communication (ERLLC), long-distance and high-mobility communication (LDHMC), and extremely low-power communication (ELPC) [1, 2].

While the first three services represent direct extension of the services proposed in the fifth generation (5G) of cellular systems, the latter two services represent a new paradigm. Current wireless systems predominantly use Orthogonal Frequency Division Multiplexing (OFDM) waveform, due to various benefits such as low peak-to-average-power ratio, higher reliability due so to diversity and better resilience to Doppler experienced in highly mobile environments however, OFDM and other multi-carrier techniques struggle significantly in the presence of mobility in the environment as the induced Doppler leads to intercarrier interference (ICI), resulting in significantly degraded quality-of-service (QoS). This issue is especially pertinent for high-mobility scenarios such as high-speed trains and non-geostationary satellite systems. This has led to the proposition of an alternative waveform, i.e., Orthogonal Time Frequency Space (OTFS), which has the capability to transform the time varying channel in time-frequency domain to invariant channel in the delay-Doppler domain.

In 5G, the 3GPP standardized the multi-numerology OFDM where flexible subcarrier spacing (and consequently symbol duration) options were provided to address the diverse user requirements such as latency, reliability, etc.

However, till this point only static delay-Doppler grids have been proposed in the available literature. The existing works only utilize homogenous delay-Doppler grids for different users in OTFS-based wireless networks.

The inventors believe that there is a need for flexible delay-Doppler grid design to fulfill the future user/application requirements.

AIM OF THE INVENTION

The purpose of this invention is to provide a flexible delay-Doppler grid, and consequently a corresponding frame design, which allows flexible resolution in the delay-Doppler domain.

Therefore, the ultimate goal of the invention is to provide more flexibility in terms of wireless channel exploitation, channel richness and interference resilience compared with conventional wireless systems. The flexible resolution can be used for various purposes such as increased diversity gains, better reliability, mobility enhancements etc in a variety of user applications and services such as driving autonomous cars, remote surgery, smart city and agriculture as well as intelligent transportation.

BRIEF DESCRIPTION OF THE INVENTION

Present invention relates to a method for flexible resource allocation in the delay-Doppler grid for an OTFS system with varying delay-Doppler grid for multi-user with doubly dispersive channel, wherein said method comprises the steps of;

i. Scheduling multiple users with different applications in delay-Doppler domain, herein the scheduling is organized on a slot by slot basis where a queue of packets are stored at the base station (BS) for each user equipments (UEs).
ii. A system with single antennas at both transmitter (Tx) and receiver (Rx) is considered wherein the reference system frame with fixed delay-Doppler grid, consisting of N number of symbols and M number of subcarriers with T symbol duration and Δf subcarrier spacing (SCS), and thus, the OTFS frame occupies a total bandwidth of B=MΔf with a frame duration of Tr=TN; and consequently, the data in delay-Doppler domain is given by x[k,l] with k and l index representing Doppler and delay indices, respectively,
iii. Generating the time domain OTFS signal by performing Heisenberg transform using M-point IFFT over time-frequency data symbols.
iv. Adding cyclic prefix (CP) of L length to mitigate the intersymbol interference between OTFS signals, herein L is the number of channel paths
v. Transmitting the OTFS signal wherein the OTFS signal undergoes the time-varying wireless channel,
vi. Removing the CP to recover the transmitted signal at the receiver side
vii. Performing Wigner transformation to recover the time-frequency representation of the received signal
viii. Performing SFFT operation to get the received signal in the delay-Doppler domain,
ix. Applying equalization process and
x. Mapping the received symbols to data information characterized in that;

The received signal of each user in processes considering the corresponding grid parameters and guard optimization is performed in either tine-frequency or delay-Doppler domain until the user constraints including desired signal-to-interference and noise ratio (SINR), data rate and round-trip time of communication are completed.

The presence of variable/flexible delay-Doppler grid for OTFS wireless systems according to the present invention, enables better exploitation of the wireless channel. This flexibility provides a better delay-Doppler resolution which can then be used to improve reliability of the system by allowing more diversity.

The method of invention enables devising a flexible delay-Doppler structure for different application and user requirements and exploiting the channel richness in delay-Doppler domain by picking the proper delay-Doppler grid structure.

To date, none of the work on OTFS has suggested the utilization of the radio resources in delay-Doppler domain in a flexible manner in order to support expoitation of a wide range used-cases in 5G and beyond wireless networks. As such, it is the most distinctive and unique element of the invention

Figure 1:
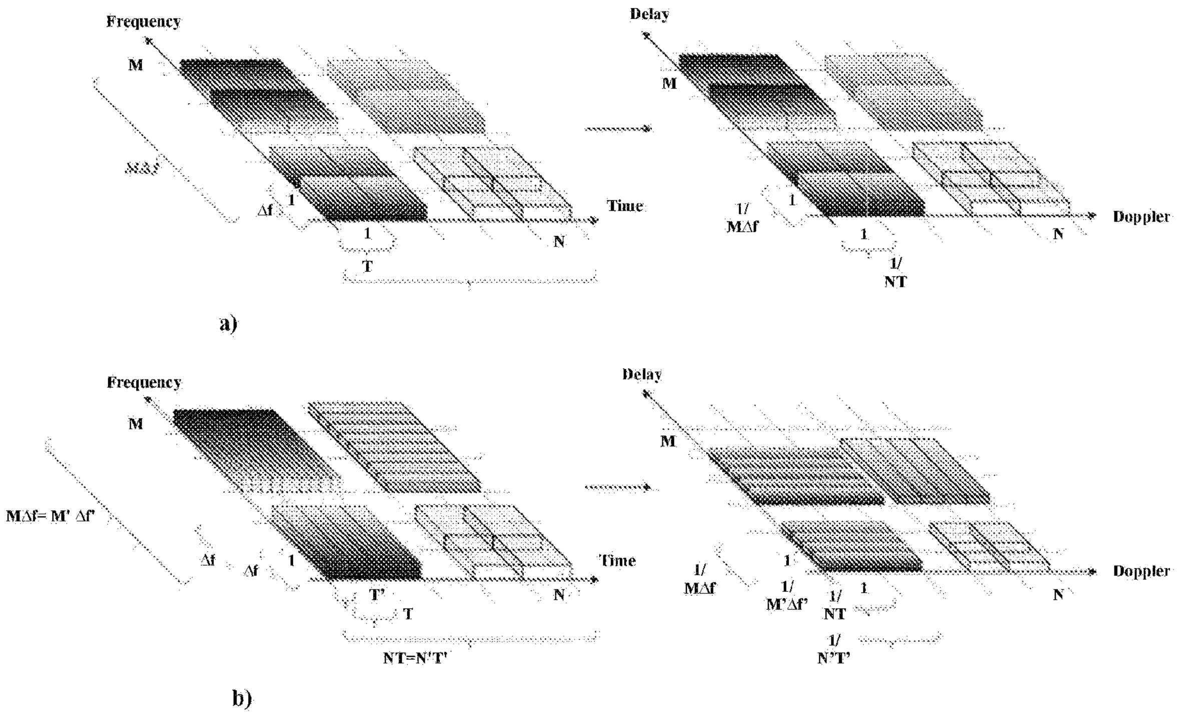
FIG. 1: Scheme showing a) conventional OTFS-based systems with fixed delay-Doppler domain grid, b) proposed OTFS-based systems with varying delay-Doppler domain grid N: number of symbols
M: number of subcarriers
$N_u$: number of symbols for e-th user
$M_u$: number of subcarriers for e-th user
T: symbol duration
NT: frame duration
$N_e$: total number of users

A: Time-frequency domain
B: Delay-Doppler domain
201: Delay-Doppler flexible radio resource guarding
202: ISFFT
203: Time-frequency flexible radio resource guarding
204: Heisenberg transform
205: Wireless channel
206: Wigner transform
207: Windowing
207: SFFT
x[k,l]: k,l-th element of X
s[n,m]: transmitted signal in time-frequency domain
x(t): transmitted signal in time domain
y(t): received signal in time domain
r[n,m]: received signal in time-frequency domain
y[k,l]: received signal in delay-Doppler domain

DETAILED DESCRIPTION OF THE INVENTION

As mentioned above, present invention relates to a method for flexible resource allocation in the delay-Doppler grid for an OTFS system with varying delay-Doppler grid for multi-user in doubly dispersive channel, wherein said method comprises the steps of;

i. Scheduling multiple users with different applications in delay-Doppler domain, herein the scheduling is organized on a slot by slot basis where a queue of packets are stored at the base station (BS) for each user equipments (UEs)
ii. A system with single antennas at both transmitter (Tx) and receiver (Rx) is considered wherein the reference system frame with fixed delay-Doppler grid consists of N number of symbols and M number of subcarriers with T symbol duration and Δf subcarrier spacing (SCS), and thus, the OTFS frame occupies a total bandwidth of B=MΔf with a frame duration of $T_f$=TN; and consequently, the data in delay-Doppler domain is given by x[k,l] with k and l index representing Doppler and delay indices, respectively
iii. Generating the time domain OTFS signal by performing Heisenberg transform using M-point IFFT over time-frequency data symbols.
iv. Adding cyclic prefix (CP) of L length to mitigate the intersymbol interference between OTFS signals, herein L is the number of channel paths
v. Transmitting the OTFS signal wherein the OTFS signal undergoes the time-varying wireless channel,
vi. Removing the CP to recover the transmitted signal at the receiver side
vii. Performing Wigner transformation to recover the time-frequency representation of the received signal
viii. Performing SFFT operation to get the received signal in the delay-Doppler domain,
ix. Applying equatization process and
x. Mapping the received symbols to data information characterized in that;
xi. The received signal of each user in processes considering the corresponding grid parameters and guard optimization is performed in either tine-frequency or delay-Doppler domain until the user constraints including desired signal-to-interference and noise ratio (SINR), data rate and round-trip time of communication are completed.

For the application of the method of invention a single OTFS cell with multi-users active ($N_e$) that perform communication with one base station in downlink/uplink transmission is considered.

In the method of the invention, the scheduling of user equipments (UEs) is organized on a slot-by-slot basis where a queue of packets are stored at the base station (BS) for each of the UEs.

The method of the invention employs an algorithm that schedules multiple users with different applications in delay-Doppler domain, resulting in a varying radio source grids, as shown in FIG. 1*b*.

The algorithm that schedules multiple users with different applications in delay-Doppler domain, as per method step (i) can be given as;

$$\{Nu,Mu\}=\max\{\text{SE,SINR}\}\&\ \min\{\text{RTT}\}$$

where $N_u$, and $M_u$ represent the delay and Doppler grid of user (u), respectively.

SE is spectral efficiency,

SINR denotes signal-to-interference and noise ratio

RTT corresponds to round trip time.

In the method of the invention a single OTFS cell with multi users active ($N_e$) that perform communication with one base station in downlink/uplink transmission is considered.

In the process of the invention, a flexible resource allocation is made because of the users' varying delay-Doppler grid, additionally this varying delay-Doppler grid needs to be controlled via a flexible radio resource scheduling algorithm.

The need for a varying delay-Doppler grid is due to the application that a particular user is serving or performing. For instance, if two users need to complete the communication within two different time durations, this causes a big problem called interference, which can distort the link for both users. Consequently, we propose the flexible radio resource utilization in order to prevent or mitigate this effect in accordance with the users' requirements (serving applications).

In the method of the invention, guard optimization makes our design different from the conventional OTFS schemes with fixed delay-Doppler, which needs to use fixed guard between the users. On the other hand, the guard for our system needs to be flexible in accordance with the flexible nature of delay-Doppler grids and users' needs.

Figure 2:
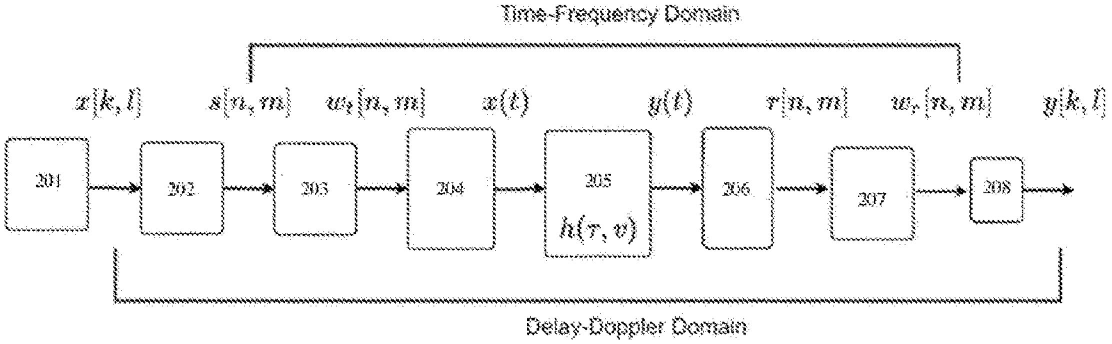
FIG. 2: Block diagram of the proposed design for OTFS system with varying delay-Doppler grid for multi-user in doubly dispersive channel.

In a preferred embodiment of the invention, for the method of the invention, a system of single antennas at both the transmitter (Tx) and the receiver (Rx) is considered The reference system frame with fixed delay-Doppler grid consists of N number of symbols and M number of subcarriers with T symbol duration and Δf subcarrier spacing (SCS), respectively. Therefore, the OTFS frame occupies a total bandwidth of B=MΔf with a frame duration of $T_f$=TN. The data in delay-Doppler domain is given by x[k,] with k and l index representing Doppler and delay, respectively. FIG. 2 illustrates the block diagram of OTFS frame for the invention.

EXAMPLES

Example 1: Application of the Method According to Present Invention

A. In this patent, we consider a single OTFS cell with multi users active ($N_e$) that perform communication with one base station in downlink/uplink transmission. The scheduling of the UEs is organized on a slot-by-slot basis, where a queue of packets is stored at the BS for each UEs. This invention, proposes an algorithm that schedules multiple users with different applications in delay-Doppler domain, resulting in a varying radio resource grids, as shown in FIG. 1*b*.

B. Regarding the system design this communication technology, we consider a system single antennas at both transmitter (Tx) and receiver (Rx). The reference system frame with fixed delay-Doppler grid consists of N number of symbols and M number of subcarriers with T symbol duration and Δf subcarrier spacing (SCS), respectively. Therefore, the OTFS frame occupies a total bandwidth of B=MΔf with a frame duration of Tr=TN. The data in delay-Doppler domain is given by x[k,l] with k and l index representing Doppler and delay, respectively. FIG. 2 illustrates the block diagram of OTFS frame for the invention.

C. To generate the time domain OTFS signal, we perform Heisenberg Transform by using M-point IFFT over time-frequency data symbols. We add a cyclic prefix (CP) of L length in order to mitigate the inter-symbol interference between the OTFS signals, where L denotes the number of channel paths. After the transmission, the OTFS signal undergoes the time-varying wireless channel.

D. At the receiver side, first we remove the CP to recover the transmitted signal. Later, we perform the Wigner transform to recover the time-frequency representation of the received signal. Following that, we perform SFFT operation to get the received signal in the delay-Doppler domain. After the equatization process, we map the received symbols to data information.

E. Part of the invention includes appropriate processing of the received signal of each user considering the corresponding grid parameters, i.e., $M_u$ and $N_u$. Consequently, to control the interference due to mixed numerology in delay-Doppler domain (varying grid) we perform guard optimization in either time-frequency or delay-Doppler domain until the user constraints are completed, including spectral efficiency (SE), desired signal-to-interference and noise ratio (SINR) and round-trip time (RTT) of the communication.

INDUSTRIAL APPLICABILITY OF THE INVENTION

The invention is applicable to industrialization, and it represents an algorithm that can be applied to any signal performing transmission for adaptive grid design in delay-Doppler domain, time-frequency domain, or in a joint manner.

Around these basic concepts, it is possible to develop several embodiments regarding the subject matter of the invention; therefore, the invention cannot be limited to the examples disclosed herein, and the invention is essentially as defined in the claims. Separate embodiments of the invention can be combined where appropriate.

It is obvious that a person skilled in the art can convey the novelty of the invention using similar embodiments and/or that such embodiments can be applied to other fields similar to those used in the related art. Therefore, it is also obvious that these kinds of embodiments are void of the novelty criteria and the criteria of exceeding the known state of the art.

The invention claimed is:

1. A method for flexible resource allocation in a delay-Doppler grid for an Orthogonal Time Frequency Space (OTFS) system for multiple users with a doubly dispersive channel in a system with a single antenna at a transmitter and at a receiver, a reference system with a fixed delay-Doppler grid having N number of symbols and M number of subcarriers with T duration and Δf subcarrier spacing (SCS), such that the OTFS frame occupies a total bandwidth of B=MΔf with a frame duration of $T_f$=TN, wherein data in a delay-Doppler domain is given by x [k,I] with k and I being respective indices representing Doppler and delay indices, the method comprising:

scheduling the multiple users with different applications in the delay-Doppler domain, the scheduling being organized in a slot-by-slot basis wherein a queue of packets are stored at a base station (BS) for equipment of each user from among the multiple users;

generating the time domain OTFS signal by performing a Heisenberg transform using M-point Inverse Fast Fourier Transform (IFFT) over time-frequency data symbols;

adding a cyclic prefix of L length so as to mitigate an intersymbol interference between OTFS signals, wherein L is a number of channel paths;

transmitting the OTFS signal wherein the OTFS signal undergoes a time-varying wireless channel;

removing the cyclic prefix so to recover the transmitted OTFS signal at the receiver;

performing a Wigner transformation so as to recover the time-frequency representation of the transmitted OTFS at the receiver;

performing a Sparse Fast Fourier Transform such that the received OTFS signal is in the delay-Doppler domain;

applying an equalization process on the received OTFS signal; and mapping the received symbols to data information, wherein the received signal of each user of the multiple users is performed in delay-Doppler domain until user constraints are completed, the user constraints being at least one of spectral efficiency, desired signal-to-interference noise ratio, and round-trip time of communication.

2. The method of claim 1, wherein the method is used in wireless system.

3. The method of claim 1, wherein the method provides a flexibly delay-Doppler grid for the OTFS system.

4. The method of claim 1, wherein the step of scheduling the multiple users is in accordance with an algorithm {Nu, Mu}=max {SE, SINR}& min {RTT}, where $N_u$, and $M_u$ represent a delay and Doppler grid of u-th user, respectively.

* * * * *